(12) United States Patent
Shapira

(10) Patent No.: US 7,685,873 B2
(45) Date of Patent: Mar. 30, 2010

(54) METHOD FOR PATH-AVERAGED CROSS-WIND MEASUREMENT

(75) Inventor: Joseph Shapira, Yavne (IL)

(73) Assignee: Soreq Nuclear Research Center, Nahal Soreq, Yavne (IL)

( * ) Notice: Subject to any disclaimer, the term of this patent is extended or adjusted under 35 U.S.C. 154(b) by 0 days.

(21) Appl. No.: 12/110,320

(22) Filed: Apr. 27, 2008

(65) Prior Publication Data

US 2008/0271524 A1     Nov. 6, 2008

(51) Int. Cl.
*G01W 1/00*     (2006.01)

(52) U.S. Cl. .................... 73/170.16; 73/170.17

(58) Field of Classification Search ............ 73/170.16, 73/170.17
See application file for complete search history.

(56) References Cited

U.S. PATENT DOCUMENTS 3,448,613 A *   6/1969   Kastner et al. ............ 73/170.16
5,544,525 A *   8/1996   Peterman et al. ......... 73/170.13
2008/0297762 A1*   12/2008   Crowe ....................... 356/5.03

* cited by examiner

*Primary Examiner*—Andre J Allen
(74) *Attorney, Agent, or Firm*—Dekel Patent Ltd; David Klein

(57) ABSTRACT

A method for crosswind velocity measurement including using a correlation between the atmosphere turbulence strength and the spatial scale spectrum of turbulence eddies in the atmosphere to calculate wind velocity.

2 Claims, No Drawings

METHOD FOR PATH-AVERAGED CROSS-WIND MEASUREMENT

FIELD OF THE INVENTION

This invention relates to remote methods of a path-averaged crosswind measurement.

BACKGROUND OF THE INVENTION

Various methods have been suggested for remote sensing of the path-averaged wind. Most of them depend on temporal analysis of reflected laser beam intensity fluctuations that are produced when refractive-index eddies are drifted by a wind across the laser beam.

R. S. Lawrence et al, in Applied Optics, Vol. 11, No. 2, pp. 239-243, describes the use of laser scintillation patterns to measure path-averaged wind velocity by measuring a time-lagged covariance function with spaced detectors.

Ting-I Wang et al, in Applied Optics, Vol. 20, No. 23, pp. 4073-4081, compares various methods with regard to their immunity to the turbulence strength changes and arrives at the conclusion that no method is ideal, mainly due to turbulence spectrum changes.

L. C. Andrews et al, in J. Opt. Soc. Am, Vol. 16, No. 6, pp. 1417-1429, whose disclosure is incorporated herein by reference, in their heuristic model of optical scintillation, shows the existence of a definite form of correlation between the turbulence strength and the turbulence spectrum. In accordance with this model the turbulence spectrum is characterized by a two-scale behavior: large scale for refractive irradiance fluctuations and small scale for diffractive irradiance fluctuations. The strong turbulence and the weak turbulence states are characterized mainly by large scales whose "life time" is significantly longer than the "life time" of the small scales, which exist mainly in the middle turbulence case.

The turbulent eddies shift with a wind, so their center moves in the wind velocity. These eddies cross a laser beam (or field of view of a receiver) and the temporal turbulence spectrum of reflected laser beam fluctuations, on which measurement most of the methods mentioned above are based, depends on turbulent eddy sizes, on a laser beam cross diameter (or field of view of a receiver) and on the "life time" of the turbulent eddies. Measurements that do not consider correlations between an atmosphere turbulence strength and spatial-temporal spectrum behavior become unpredictable.

U.S. Pat. Nos. 4,182,570 and 6,247,259, and PCT Published Patent Application WO2005/050254 describe various methods and devices for measuring wind speed normal to the path from the generated signal. It is stated in the patents that the methods and the devices based on cross-covariance function analysis can be applied for meteorological determinations and to fire control systems. It is mentioned that unpredictable changes in a spatial-temporal spectrum of atmosphere turbulence impact on the mathematical analysis results, but any methods for carrying into practice a correlation between an atmosphere turbulence strength and spatial-temporal spectrum of atmosphere turbulence are not described.

SUMMARY OF THE INVENTION

It is an object of this invention to provide a remote method of a path-averaged crosswind measurement that is more accurate than any such method provided by the art. The present invention seeks to provide a novel active method for wind velocity measurement, as described herein below. Unlike the prior art, the present invention picks up only a part with the largest scale of the spatial spectrum of turbulence eddies in the atmosphere. In accordance with one non-limited embodiment of the invention, the method measures wind velocity by using a correlation between an atmosphere turbulence strength and spatial-temporal spectrum of atmosphere turbulence.

DETAILED DESCRIPTION OF EMBODIMENTS

More specifically the method may include the steps of:

a—sending a laser beam toward a desired far object position;

b—taking an image (e.g., movie) of a far object (e.g., laser spot on the object) by a multi-element receiver or by the multi-element receiver receiving the beam reflected by the object;

c—determining the object range by measuring the time lag between the generation of the laser beam and the reception of the reflected beam;

(Methods for range determination, which can be used to carry out this step, are described, e.g., in The Infrared Electro-Optical Systems Handbook, Vol, 6: "Active Electro-Optical Systems", Clinton S. Fox Editor, SPIE Press 1993, USA)

d—computing a normalized time-lagged cross-correlation function (CCF) of signals obtained from different elements of the receiver after filtering the signals by means of a low band pass filter with a variable cut-off frequency;

e—determining a specific cut-off frequency $f_{cut}^s$ of the low band pass filter correspondences to the maximum dissymmetry of the cross-correlation function $\xi_{max}$ and obtaining therefrom a wind direction. The CCF dissymmetry $\xi$ is given by:

$$\xi = \frac{\Sigma CCF_{pos} - \Sigma CCF_{neg}}{\Sigma CCF_{pos} + \Sigma CCF_{neg}},$$

wherein $\Sigma CCF_{pos}$ and $\Sigma CCF_{neg}$ are the cumulative values in the positive and negative parts of the CCF accordingly. The sign of the $\xi_{max}$ gives the crosswind direction.

f—computing a variance $\sigma_c^2$ of the image centroid displacements and calculating therefrom the atmosphere turbulence strength $C_n^2$.

For double-pass distance L the turbulence strength $C_n^2$ is given by:

$C_n^2 = 0.34 \sigma_c^2 L^{-1} D^{1/3}$, here D is a diameter of the receiver optics.

g—determining an effective spatial scale of refractive irradiance fluctuations that is given (e.g., according to L. C. Andrews et al.) by a coherence radius $\rho_0$ for weak turbulence state or by $L/k\rho_0$ for strong turbulence state, both values are calculated using the earlier obtained turbulence strength $C_n^2$, the double-pass distance L and the known wave number k (e.g., for plane wave $\rho_0 = (1.46 C_n^2 k^2 L)^{-3/5}$). The specific area of the object can be chosen for cross-wind velocity calculation by adjusting a field of view of the receiver (e.g., by choosing a proper number of the receiver elements) in accordance with the determined spatial scale, that noted with the long "life time".

h—computing the specific frequency $f_c$ of the cumulative signal received from the earlier chosen part of the object after filtering the aforementioned signal by mean the low band pass filter with specific cut-off frequency $f_{cut}^s$. The specific frequency $f_c$ can be obtained, e.g., by computing the number of zero crossing points (number of times the momentary signal cross the average signal).

i—obtaining path-averaged crosswind velocity which is proportional to the specific frequency $f_c$. Specific frequency $f_c$ is characterized by the number of eddies, which size corresponds to the determined spatial scale that crossed the field of view of the receiver in a time unit. A value of the proportional coefficient depends on the distance to the object and the turbulence strength $C_n^2$ and is determined after using a proper calibration.

The novel method essentially reduces a negative influence in dynamics (changes) of the turbulence eddies spatial spectrum during a crosswind measurement, since by using a proper correlation between the atmosphere turbulence strength and the spatial scale spectrum of turbulence eddies in the atmosphere, the method picks up, mainly, the eddies with the long "life time".

What is claimed is:

1. A method for crosswind velocity measurement comprising:
   using a correlation between the atmosphere turbulence strength and the spatial scale spectrum of turbulence eddies in the atmosphere to calculate wind velocity;
   taking an image (movie) of a far object illuminated by a laser through a turbulent atmosphere, wherein an intensities of a light scattered by different parts of the object are time-correlated and depend on a wind velocity and on the atmosphere turbulence strength, wherein a frequency of a light fluctuations proportional to the wind velocity component perpendicular to the line of sight (line of the laser beam propagation) and depends on "life time" of turbulence eddies;
   obtaining a time-lagged cross-correlation function of the intensities between the different parts (areas) of the object;
   computing a dissymmetry of the obtained cross-correlation function after low band pass filtering with different cut-off frequencies; and
   obtaining a specific cut-off frequency $f_{cut}^s$ correspondences to the maximum dissymmetry of the cross-correlation function and calculating therefrom a wind direction and a wind velocity which determined only by moving of eddies with the long "life time".

2. The method according to claim 1, comprising:
   obtaining an atmosphere turbulence strength by said computing a variance of the image centroid displacements;
   determining an effective spatial scale of turbulence eddies by using a proper correlation between the atmosphere turbulence strength and the spatial turbulence spectrum, and adjusting dimensions of the analyzed image area in accordance with the obtained effective spatial scale;
   computing the specific frequency $f_c$ of the cumulative signal received from the obtained image area after filtering the signal by mean the low band pass filter with specific cut-off frequency $f_{cut}^s$; and
   determining the proper proportional coefficient between crosswind velocity and obtained specific frequency $f_c$ in accordance with the obtained value of turbulence strength and the known distance to the object for calculating therefrom the path-averaged crosswind velocity.

\* \* \* \* \*